US012504727B2

(12) United States Patent
Sandler et al.

(10) Patent No.: US 12,504,727 B2
(45) Date of Patent: Dec. 23, 2025

(54) SYSTEMS AND METHODS MANAGING CONTAINERS IN AN OPERATIONAL TECHNOLOGY NETWORK

(71) Applicant: Rockwell Automation Technologies, Inc., Mayfield Heights, OH (US)

(72) Inventors: Nathaniel S. Sandler, Chagrin Falls, OH (US); Bruce T. McCleave, Jr., Mission Viejo, CA (US); James M. Teal, New Brunswick, NJ (US); Bart Nieuwborg, Saint Priest (FR); Todd A. Wiese, Hubertus, WI (US); Jonathan A. Mills, Mayfield Heights, OH (US); Michael J. Anthony, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 568 days.

(21) Appl. No.: 17/955,179

(22) Filed: Sep. 28, 2022

(65) Prior Publication Data

US 2024/0103894 A1    Mar. 28, 2024

(51) Int. Cl.
  *G05B 13/04*   (2006.01)
  *G05B 17/00*   (2006.01)
  (Continued)

(52) U.S. Cl.
  CPC ............. *G05B 13/04* (2013.01); *G05B 17/00* (2013.01); *G05B 17/02* (2013.01);
  (Continued)

(58) Field of Classification Search
  None
  See application file for complete search history.

(56) References Cited

U.S. PATENT DOCUMENTS 10,715,388 B2    7/2020  Fildebrandt et al.
11,182,206 B2   11/2021  Jung et al.
(Continued)

FOREIGN PATENT DOCUMENTS

KR    20200027783 A    3/2020
WO    2020184362 A1    9/2020

OTHER PUBLICATIONS

Extended European Search Report for European Patent Application No. 21179775.8, dated Nov. 25, 2021, 9 pages.

(Continued)

*Primary Examiner* — Qing Yuan Wu
(74) *Attorney, Agent, or Firm* — Fletcher Yoder, P.C.

(57) ABSTRACT

A computer readable medium stores instructions that cause a processor to receive an indication of a request for analysis of a simulation model associated with an industrial automation system, wherein the industrial automation system includes a plurality of devices, wherein each of the plurality of devices includes a respective compute surface configured to perform one or more software tasks, identify a first device of the plurality of devices having sufficient resources to perform the analysis, and deploy a container to the first device. The container is configured to collect data from one or more sensors disposed in or around the industrial automation system, update the simulation model based on the collected data, and provide the updated simulation model for distribution to one or more other devices of the plurality devices.

20 Claims, 7 Drawing Sheets

(51) Int. Cl.
    *G05B 17/02*     (2006.01)
    *G05B 19/418*     (2006.01)
    *G06F 9/455*     (2018.01)

(52) U.S. Cl.
    CPC ....... *G05B 19/41885* (2013.01); *G06F 9/455* (2013.01); *G06F 2009/4557* (2013.01)

(56) References Cited

U.S. PATENT DOCUMENTS

| | | | |
|---|---|---|---|
| 11,303,852 B2 * | 4/2022 | Takahashi | G06F 9/455 |
| 11,474,873 B2 | 10/2022 | Biernat et al. | |
| 11,513,877 B2 | 11/2022 | Biernat et al. | |
| 2018/0024537 A1 | 1/2018 | Chauvet et al. | |
| 2018/0054469 A1 | 2/2018 | Simoncelli | |
| 2019/0377604 A1 | 12/2019 | Cybulski | |
| 2020/0136906 A1 | 4/2020 | Bernat et al. | |
| 2020/0249928 A1 | 8/2020 | Zeng et al. | |
| 2020/0278892 A1 | 9/2020 | Nainar et al. | |
| 2020/0311617 A1 | 10/2020 | Swan et al. | |
| 2021/0089354 A1 | 3/2021 | Nixon et al. | |
| 2021/0200814 A1 | 7/2021 | Tal et al. | |
| 2021/0218617 A1 | 7/2021 | Palavalli et al. | |
| 2021/0382727 A1 | 12/2021 | Vigil et al. | |
| 2022/0027217 A1 | 1/2022 | Thoemmes et al. | |
| 2022/0091572 A1 | 3/2022 | Biernat et al. | |

OTHER PUBLICATIONS

Partial European Search Report for European Patent Application No. 21180068.5, dated Dec. 8, 2021, 17 pages.
Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.
European Search Report for European Patent Application No. 21180068.5, dated Mar. 28, 2022, 19 Pages.
Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.
European Search Report for European Patent Application No. 21180279.8, dated Apr. 19, 2022, 12 Pages.
D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).
A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).
Liu, Y. et al., "A Data-Centric Internet of Things Framework Based on Azure Cloud," IEEE Access, vol. 7, Mar. 27, 2019, 20 pages.

\* cited by examiner

SYSTEMS AND METHODS MANAGING CONTAINERS IN AN OPERATIONAL TECHNOLOGY NETWORK

BACKGROUND

The present disclosure generally relates to systems and methods for utilizing a container orchestration system in an operational technology (OT) or an industrial platform to improve operation of the platform. More particularly, embodiments of the present disclosure are related to systems and methods for leveraging container orchestration systems to coordinate and improve operations of OT devices.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the OT environment are used to control industrial devices accessible via an OT network. Although the industrial control systems may be used to manage the operations of the devices within the OT network, improved systems and methods for operating devices within the OT network are desirable. For example, improved techniques for configuring container architectures, responding when devices within the OT network become inoperable, executing updates to OT devices, and improving simulation models within the OT network are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium storing instructions that, when executed by a processor, cause the processor to: receive an indication of a request for analysis of a simulation model associated with an industrial automation system, wherein the simulation model simulates one or more characteristics of the industrial automation system, wherein the industrial automation system includes a plurality of devices configured to perform one or more operations within the industrial automation system, wherein each of the plurality of devices includes a respective compute surface configured to perform one or more software tasks, identify a first device of the plurality of devices having sufficient resources to perform the analysis, and deploy a container to the first device, wherein the first device is configured to execute the container on the respective compute surface. The deployed container is configured to collect data from one or more sensors disposed in or around the industrial automation system, update the simulation model based on the collected data, and provide the updated simulation model for distribution to one or more other devices of the plurality devices.

In another embodiment, a method includes receiving, via at least one processor, an indication of a request for analysis of a simulation model associated with an industrial automation system including a plurality of devices, wherein the simulation model simulates one or more characteristics of the industrial automation system, identifying, via the at least one processor, a first device of the plurality of devices having sufficient resources to perform at least a portion of the analysis, deploying, via the at least one processor, a container to the first device, wherein the first device is configured to execute the container on the respective compute surface, wherein the container is configured to collect data from one or more sensors disposed in or around the industrial automation system, receiving, via the at least one processor, the collected data from the container, updating, via the at least one processor, the simulation model based on the received collected data, and transmitting, via the processor, the updated simulation model to one or more other devices that perform one or more operations within the industrial automation system.

In a further embodiment, a system includes a plurality of devices configured to perform a plurality of operations within an industrial automation system, a gateway device configured to operate on an information technology (IT) network and an operational technology (OT) network, and a processor. Each of the plurality of devices includes a compute surface configured to perform one or more software tasks. The processor is configured to receive an indication of a request for analysis of a simulation model associated with the industrial automation system, wherein the simulation model simulates one or more characteristics of the industrial automation system, identify a first device of the plurality of devices having sufficient resources to perform the analysis, deploy a container to the first device, wherein the first device is configured to execute the container on the respective compute surface, wherein the container is configured to collect data from one or more sensors disposed in or around the industrial automation system, receive the collected data from the container, transmit the collected data to the gateway device, receive an updated simulation model from the gateway device, and provide the updated simulation model for distribution to one or more other devices of the plurality devices.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

Figure 3:
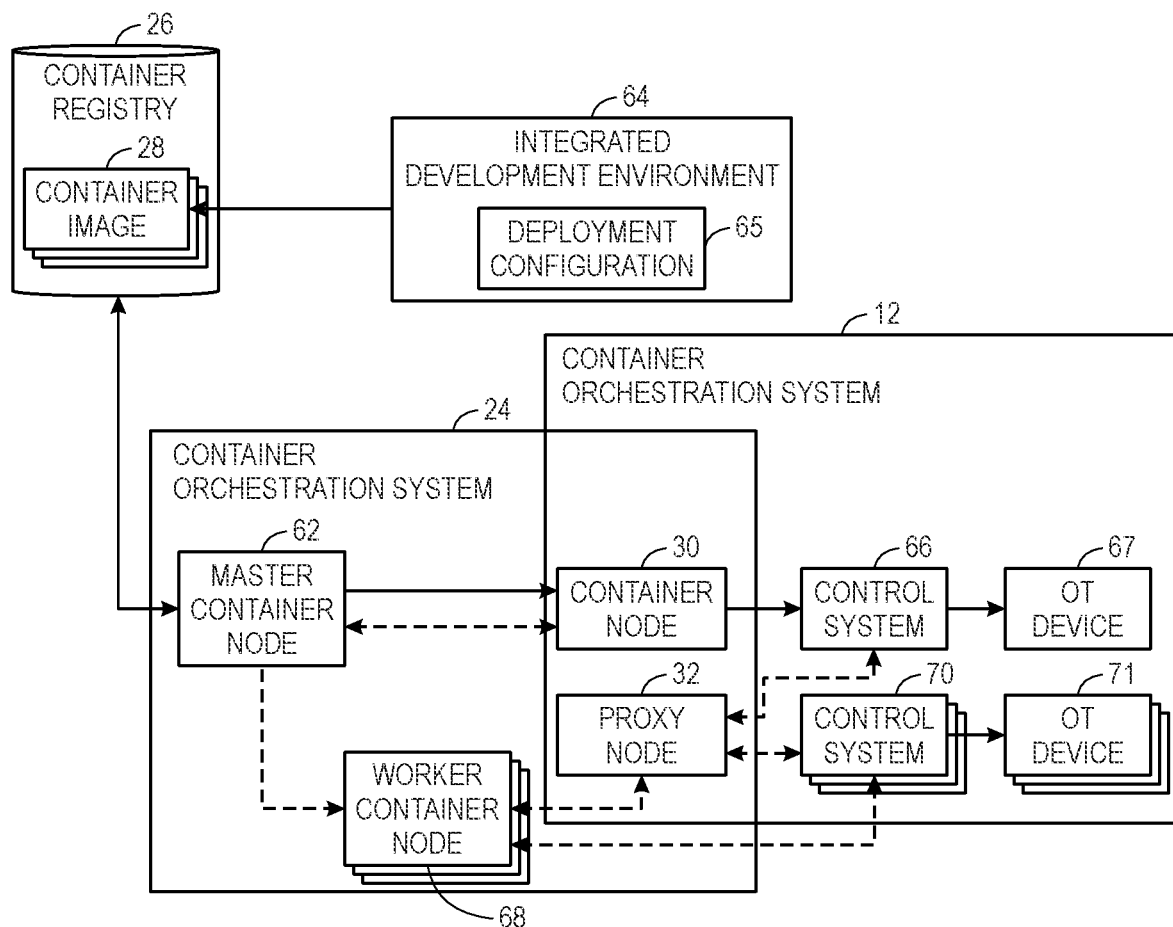
FIG. 3 is a block diagram of an example operational technology (OT) network that coordinates with a container orchestration system, in accordance with an embodiment.
Figure 8:
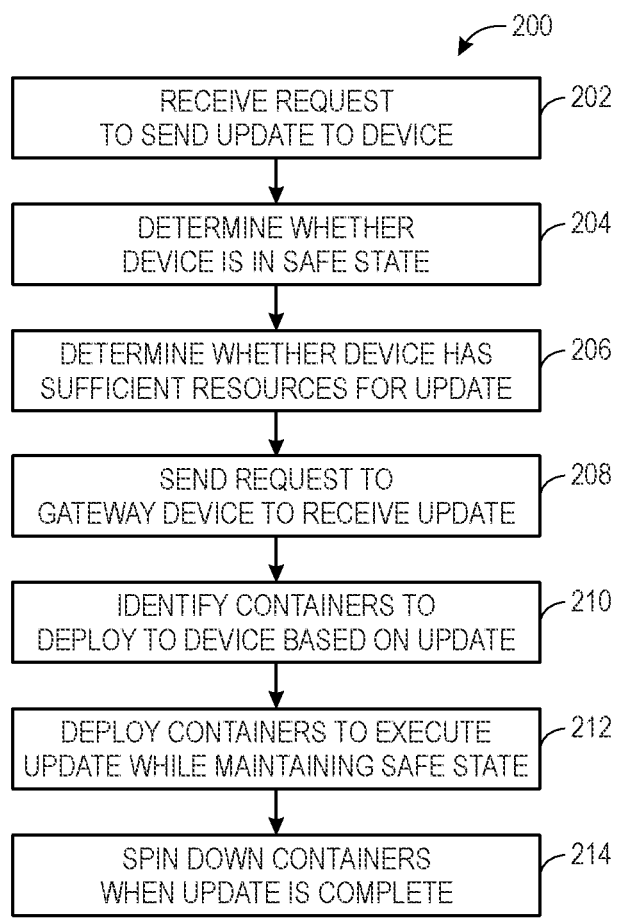
Figure 9:
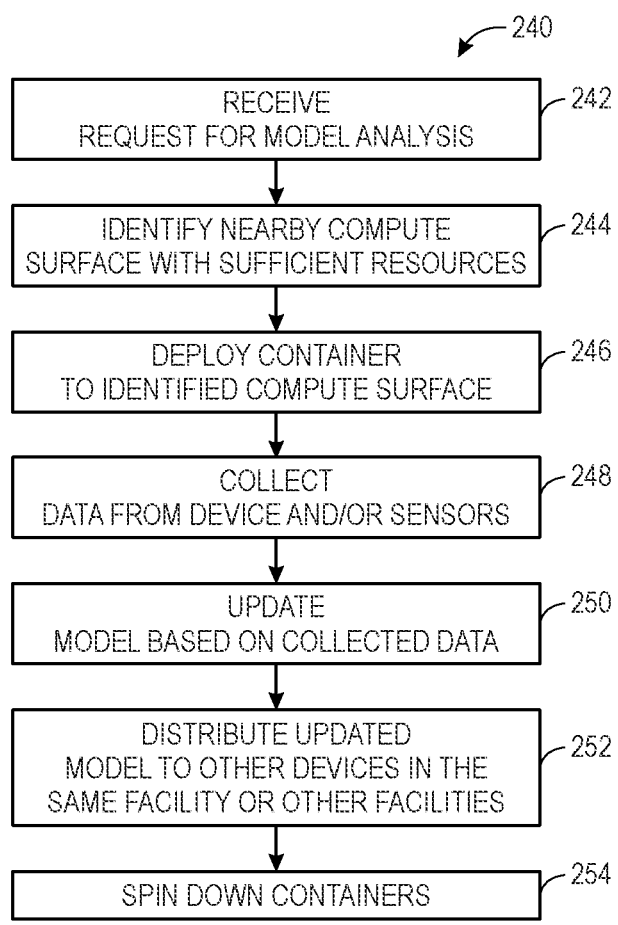

FIG. 8. is a flow chart of a method for updating an OT device in the OT network of FIG. 3, in accordance with an embodiment; and FIG. 9 is a flow chart of a method for using sensors to update a simulated model of an OT device or system and distributing the updated model to similar devices and/or systems, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Industrial automation customers are accustomed to designing system functionalities based on user or industry-specific profiles. That is, a particular type of factory may be associated with certain profiles that may be used to identify software tools or devices to employ within the respective factory. With this in mind, container profile registries may be maintained to specify the types of containers that are recommended to be deployed within the industrial automation system. That is, before commissioning or starting a slew of OT devices, a user may select an industry profile and receive a recommended set of containers to deploy to the available OT devices. For example, an industry profile may be provided for a particular application (e.g., baggage claim system vs. manufacturing). The user may then select an operation mode that may be part of the selected industry profile. The operation mode may correspond to certain types of operations or functions being performed within the facility. The functions being performed at a facility may be coordinated using a number of containers deployed to different devices in the facility. For instance, a set of containers deployed to different devices may perform data collection tasks, performance analysis, tuning operations, and the like.

After receiving the selected operation mode, the container deployment system may identify the set of containers associated with the selection and retrieve data from the various compute surfaces and equipment present in the industrial automation system. The container deployment system may identify suitable pieces of equipment to perform the types of functions associated with the set of containers, determine whether control systems accessible to those pieces of equipment have suitable computing resources to execute the set of containers, and deploy the set of containers to those computing resources in response to determining that the computing resources are indeed sufficient.

After the containers are deployed to their respective devices, the container deployment system may update a registry that records the identity or type of container that has been deployed to each device. Indeed, even after containers are deployed to certain devices, the container functions may be modified to operate in accordance with a user's desires or preferences. These modifications may be saved in the register to maintain an accurate record of the states of each container. In some embodiments, additional or replacement computing surfaces are identified and recorded in the register to provide the container deployment system back up or failsafe locations to deploy replacement container in case equipment loses power or becomes inoperable.

With this in mind, the container deployment system may be able to detect when a device is being replaced or has become inoperable. In this case, the container deployment system may retrieve the records associated with the respective device to redeploy containers to perform the respective operations. During the intermediate time before replacement, the container deployment system may deploy containers to the replacement computing surfaces identified earlier to allow the other containers to continue to perform their respective operations. In some embodiments, these containers may provide simulated or virtual data for data to which they may no longer have access to help ensure that the other containers may continue to perform their respective operations.

Remote updates, such as firmware updates, may be provided to OT devices via the cloud or other network locations, but some customers are hesitant to allow these types of updates to occur ad hoc. That is, the OT devices are usually performing coordinated operations with a number of other machines. As such, an update executed on one device may affect the operations of another device or the overall system.

With this in mind, before scheduling an update to be pushed to a container, a container deployment system may monitor the computing state of the respective device and the machine state of the respective device and the related devices. That is, the machine state may provide context with regard to the safety or ongoing processes of the machines within the industrial automation system. That is, for example, if a container detects or has access to data indicating that a light curtain has been active within a certain amount of time, the container deployment system may determine that an individual may be present in the facility and an update should not be pushed to the device at that time. In another example, the container deployment system may confirm that a user maintaining the system is authenticated to perform the update. In this way, the container deployment system considers the computational resources, as well as the machine/environment states of the system, to ensure that the update is being provided at an appropriate time.

In some embodiments, the container deployment system may reside within the industrial or OT network, while a nested edge device or gateway device operates in an IT network. The container deployment system may serve as a bridge to the OT devices, while only implementing or deploying functions when the machine state and computational resources are amenable to the update. As a result, the edge device may receive a request for an update after the container deployment system determines or schedules an appropriate to time to receive the update.

In motion systems with rotary motors, actual motor torque may differ from the motor torque predicted by a simulation model. This discrepancy may become more acute in non-direct drive applications involving torque transferring loads, such as a gear box. Model accuracy may be a barrier to the widespread adoption of digital twin technology.

There are ways to improve the model accuracy through additional sensors which are often expensive, and model calibration and learning in the actual customer settings. Furthermore, there are cases run time model learning consumes too many computational resources of the local processer to be practical to run on all similar devices all the time.

The present disclosure includes building and refining the model on one device in real customer application, with additional sensors as needed, and sharing the updated model to other similar devices in the same customer plant via container technology. The continuously improving model may be further distributed to similar devices operating on other customer plants through cloud. In other words, what is learned from one device can potentially benefit all similar devices running in similar situations globally in real time or near-real time. Further, the motor models which can benefit from this technology are not limited to torque estimation. Other models include thermal model, bearing life prediction, among others. Additional details will be discussed below with reference to FIGS. 1-9.

Figure 1:
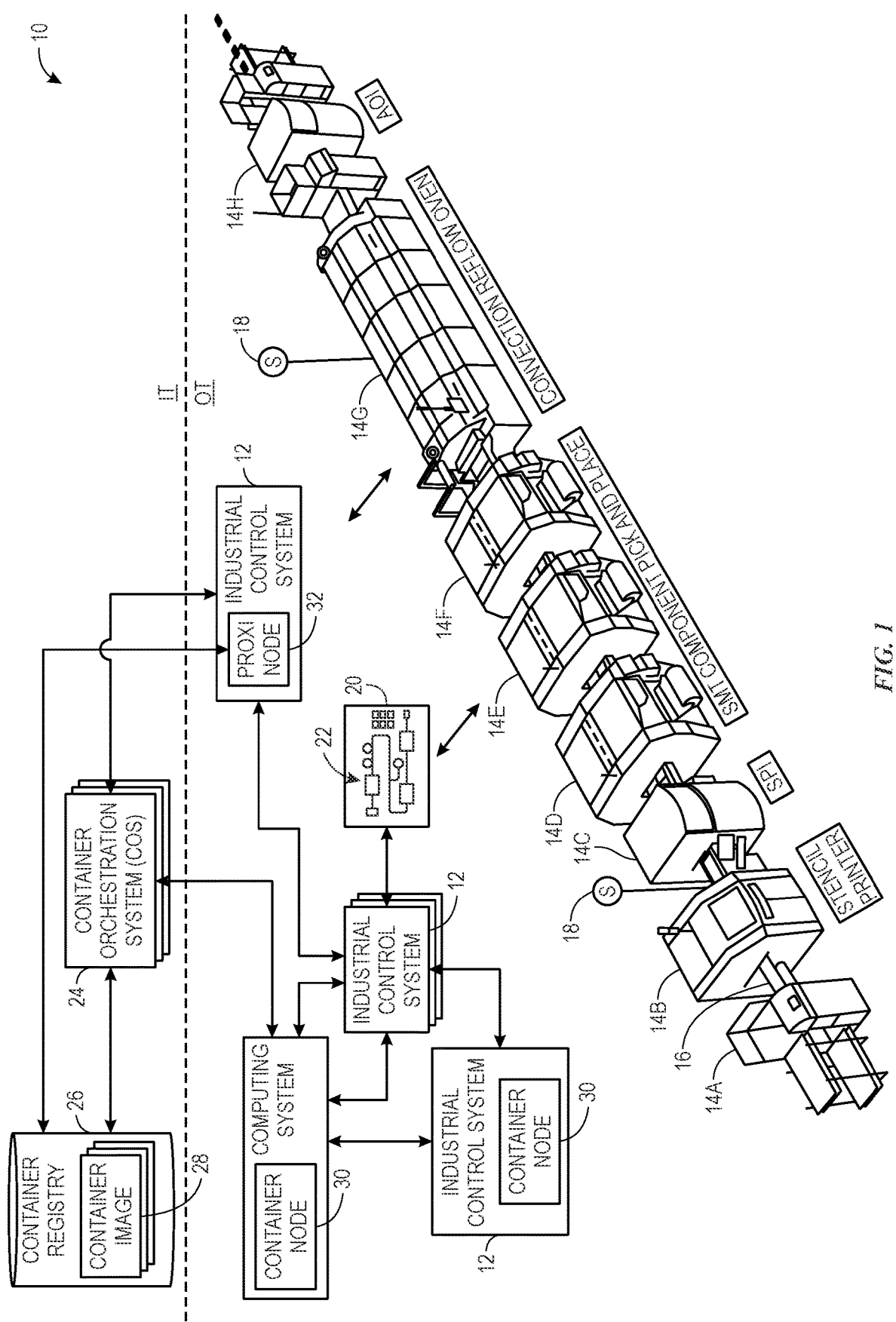
FIG. 1 is a perspective view of an example industrial automation system, in accordance with an embodiment.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
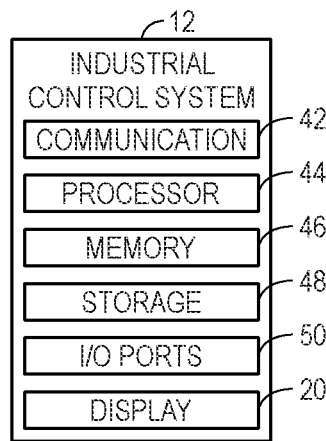
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

Figure 4:
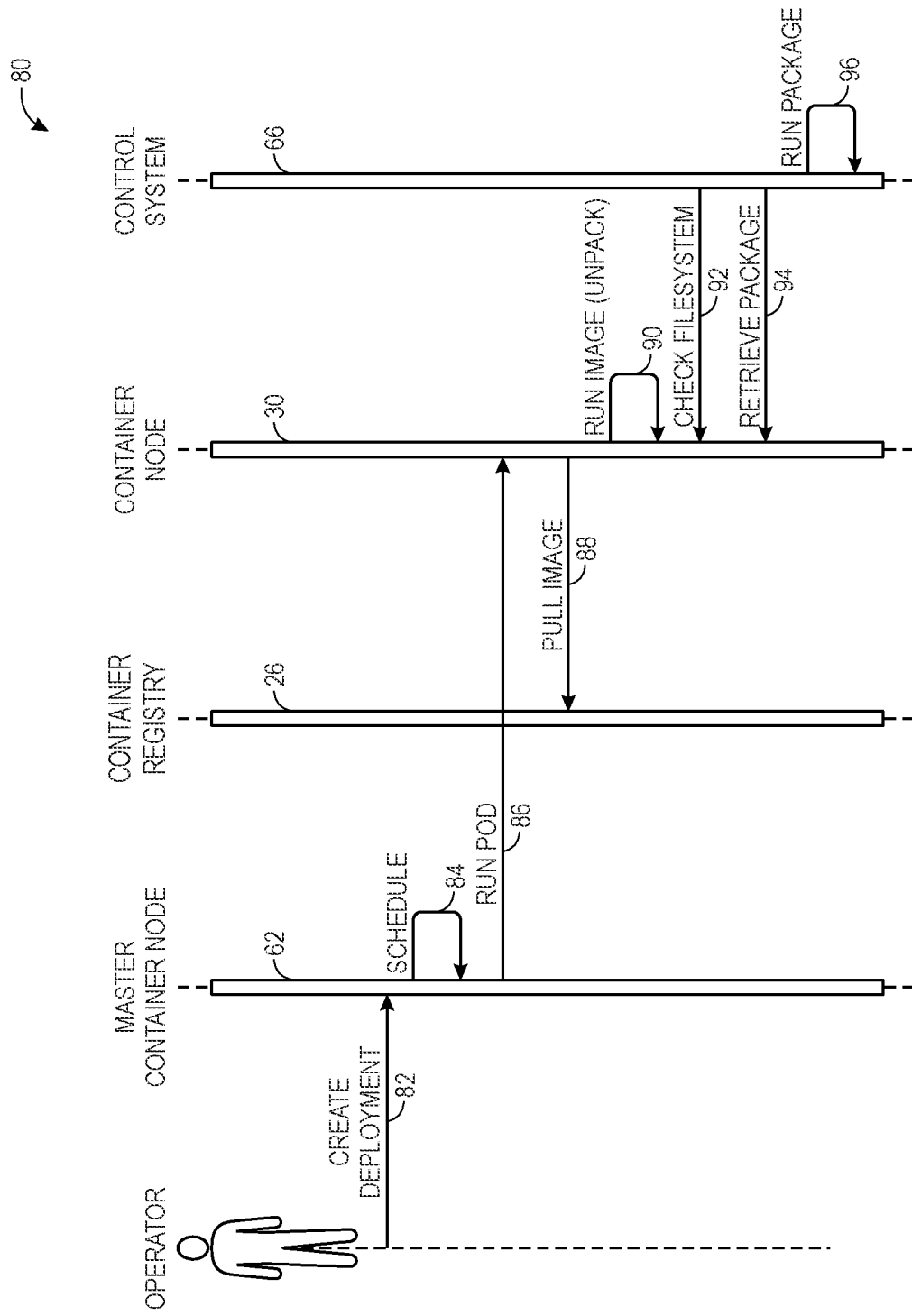
FIG. 4 is a sequence diagram illustrating the deployment of container pods to industrial control systems in the OT network of FIG. 3, in accordance with an embodiment.

FIG. 4 illustrates a sequence diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an update indicative of the package no longer executing the package, the master container node 62 may schedule deployment of another pod to another container node 30 for execution to maintain the desired state.

Figure 5:
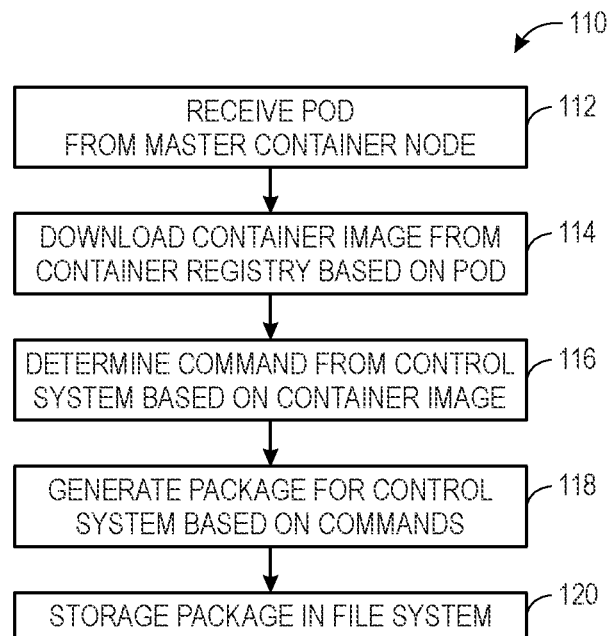
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66. In some embodiments, the control system 66 may be used to perform a macro batch control sequence.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
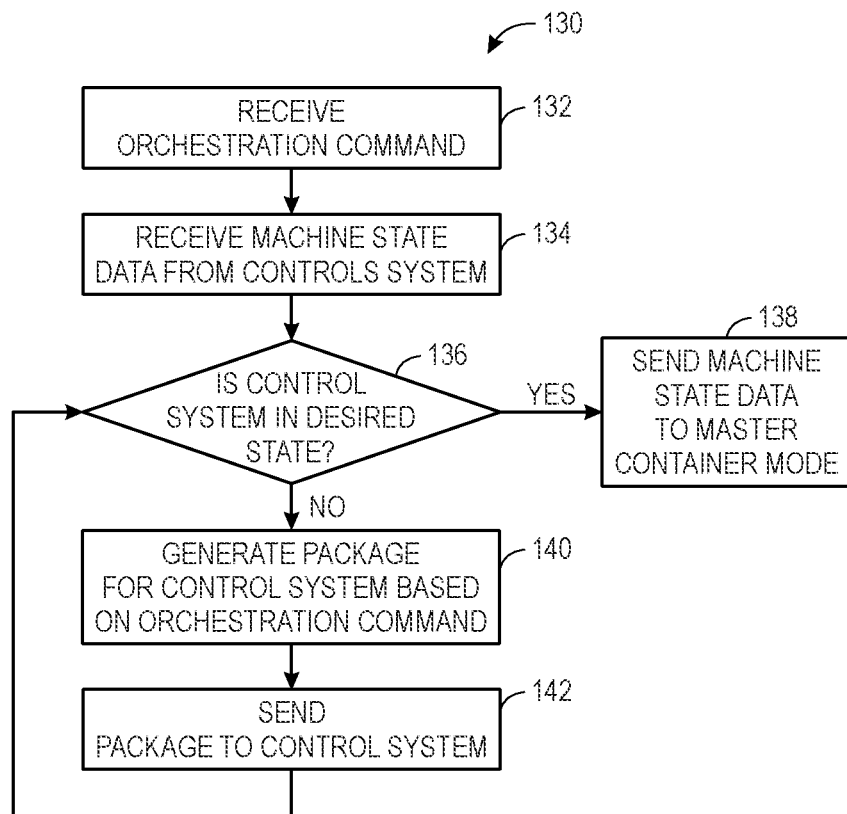
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In other embodiments, the container node 30 may determine that it is safe to perform certain actions, such as changing state to download a firmware update, perform maintenance/service, etc. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform analysis operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Returning to FIG. 1, industrial automation customers may be accustomed to designing system functionalities around user or industry-specific profiles. For example, the industrial automation system 10 of FIG. 1 is configured to perform silicon wafer manufacturing, and thus may be utilizing a silicon wafer manufacturing or semiconductor industry-specific profile. However, in other embodiments, the industrial automation system 10 may be configured to perform some other process based on an industry-specific profile related to food and/or beverage manufacturing, bottling, coffee roasting, oil and gas extraction, oil and gas storage and/or transport, oil refining, chemical processing, chemical refining, cosmetics, pharmaceuticals, consumer electronics manufacturing, battery manufacturing, consumer product manufacturing, tire manufacturing, medical device manufacturing, aerospace, military, automotive, mining, lumber, paper, pet food, textiles, brewing, wine making, distilling, agriculture, airport baggage handling, and so forth. Though different facilities in the same industry may be different from one another in some ways (e.g., operated by different entities, performing different processes, making different products, using different ingredients, using different operating parameters, etc.), a facility brewing beer is likely to have more in common with another facility brewing beer than it will with a facility manufacturing aircraft parts. Similarities in processes within an industry, internal or external standards for an industry, and so forth, may result in similarities in devices and/or software tools utilized by different facilities in the same industry. Further, facilities in the same industry may assign people to similar roles to perform similar tasks (e.g., quality control, auditing, material loading, maintenance, troubleshooting, etc.). Accordingly, a supplier of industrial automation components and/or services to various customers in different industries may analyze known data for various facilities in the same industry and generate one or more industry profiles and/or user profiles for that industry. The industry profile may define a baseline architecture of devices and/or software tools that can be used by a customer as a starting point or default architecture from which to make customizations, rather than starting from nothing. Accordingly, a particular type of factory (e.g., in the embodiments shown in FIG. 1, silicon wafer manufacturing) may be associated with one or more profiles that may be used to identify software tools or devices to employ within the respective factory. With this in mind, container profile registries may be generated and maintained to specify a baseline container architecture (e.g., the types and quantities of containers) recommended for deployment within the industrial automation system based on an industry-specific profile.

Figure 7:
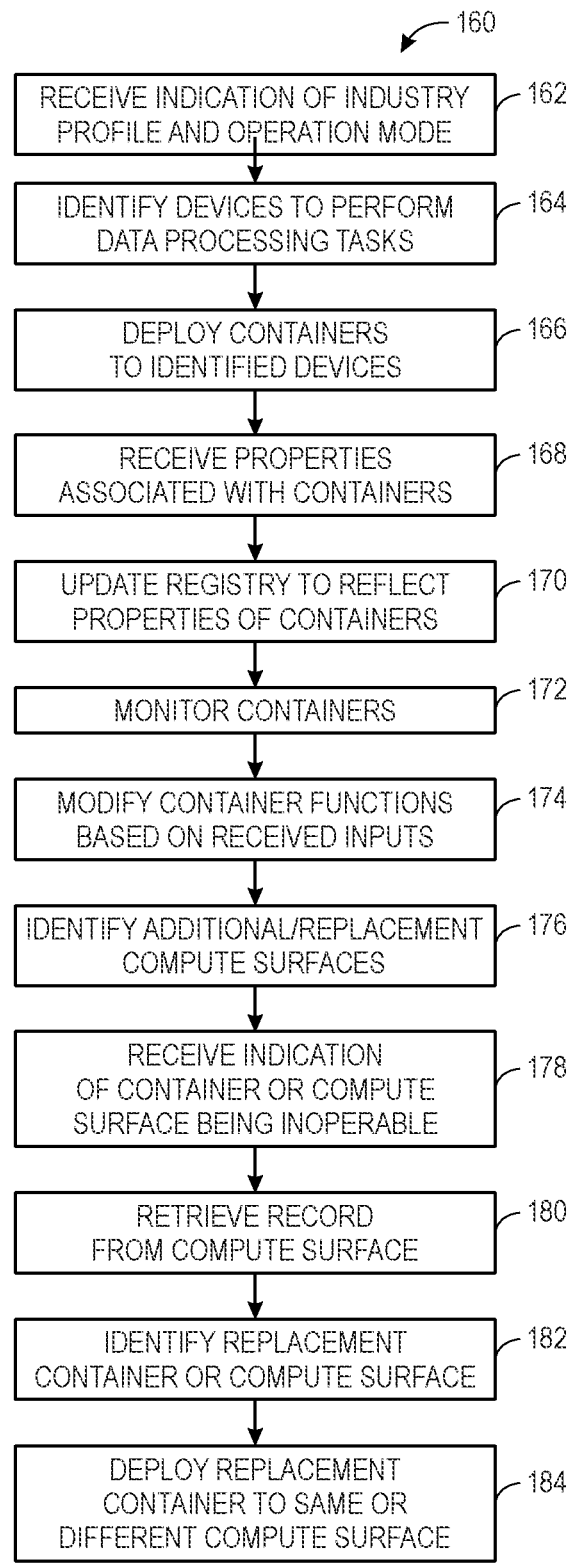
FIG. 7 is a flow chart of a method for using industry profiles to manage container deployment in the OT network of FIG. 3, in accordance with an embodiment.

With the foregoing in mind, FIG. 7 is a flow chart of a process 160 for using industry profiles to manage container deployment in a facility. At block 162, the process receives an indication of one or more industry profiles. For example, before commissioning or starting a group of OT devices, a user may select an industry profile. The industry profile may broadly refer to an industry (e.g., food and beverage, pharmaceutical, cosmetics, oil and gas, etc.), or may refer to a more specific process being performed (e.g., brewing beer, pasteurizing milk, bottling a beverage, refining oil, etc.). In some embodiments, the industry profile, or a name of an industry may be provided by the customer, whereas in other embodiments, the customer may select the industry profile from a list of options. In some embodiments, the customer may search for an industry profile, use a search function to narrow or filter a list of available industry profiles, or the customer may navigate through a nested list of available industry profiles that are sorted by various categories (e.g., food and beverage/non-alcoholic beverages/carbonated beverages/bottling, etc.). In some embodiments, the user may provide multiple industry profiles, which may identify and industry and a process being performed within that industry, such as "food and beverage" and "brewing beer". In other embodiments, the multiple industry profiles may provide increasing levels of specificity in an industry, such as "food and beverage", "beverage", "alcoholic beverage", "beer", "canned beer", "canned lager". In such embodiments, the broadest industry profile may be considered the industry profile, while the more specific industry profiles may be considered sub-industry profiles that are subcategories within the industry profile. In some embodiments, the customer may provide or select an operation mode from one or more options associated with the industry profile. The operation mode may correspond to certain types of operations or functions being performed within the facility. For example, in the silicon wafer manufacturing example shown in FIG. 1, the operation modes may include loading (e.g., station 14A), printing solder paste to the substrate via stenciling (e.g., station 14B), solder paste inspection (SPI) (e.g., station 14C), surface mounting (e.g., stations 14D, 14E, and 14F), convection reflow (e.g., station 14G), automated optical inspection (e.g., station 14H), and so forth. However, it should be understood that the silicon wafer manufacturing facility having the stations shown in FIG. 1 is merely an example and that different types of facilities with different operations are also envisaged.

The functions being performed at a facility may be coordinated using a number of containers deployed to different compute surfaces (e.g., associated with devices) within the facility. Accordingly, after the industry profile and/or operation modes have been received, the process may identify a baseline architecture of containers for deployment within the facility based on the received industry profiles and/or the received operation mode. For instance, a set of containers deployed to different devices may perform data collection tasks, performance analysis, tuning operations, and the like. At block 164, the process 160 retrieves data from various compute surfaces and/or devices within the OT network and identifies suitable pieces of equipment to perform the types of functions associated with the set of containers. Considerations may include, for example, proximity to specific devices (e.g., physical distance, network distance, number of intervening network devices, etc.), available resources to execute the set of containers, capability to perform certain functions carried out by the containers, effect on communication latency, effect on resource allocation, location within network (e.g., same or different subnets), and so forth.

At block 166, the process deploys or schedules deployment of the set of containers to those computing resources in response to identifying one or more host compute surfaces for the container according to a deployment configuration file. As previously discussed, deploying the set of containers may involve transmitting a container pod and/or one or more container images to the identified compute surfaces. The identified compute surfaced may then execute the received container image or images to spin up the containers. At block 168, properties associated with the containers are received. The properties may include, for example, the type of container deployed, the container's state, whether the container is active, and various other parameters of the deployed containers. In some embodiments, the received properties may be compared to the deployment configuration file to determine whether the deployed containers are operating as set forth in the deployment configuration file. At block 170, the received properties may be compared to data stored in the container registry and the container registry updated to reflect any discrepancies.

At block 172, the process 160 monitors the deployed containers. The monitoring may include, for example, periodically pulling data from the containers or some intermediate storage, periodically receiving data from the containers or some intermediate storage, or some combination thereof. Data may be received one or more streams, on a schedule, on demand, upon some triggering event (e.g., an alert, some condition being detected, in response to a request, a threshold number of records or amount of data being accrued, etc.). The collected data may be analyzed to identify various operational parameters and/or characteristics of the containers and compare the analyzed data to the registry, the deployment configuration file, and/or some other collection of expected or anticipated container parameters. As previously discussed, if the operational parameters and/or characteristics of the containers derived from the collected data do not match the registry, the deployment configuration file, and/or some other collection of expected or anticipated container parameters, the container orchestration system may modify the containers and/or the compute surfaces on which the containers are running until the operational parameters and/or characteristics match those set forth in the registry, the deployment configuration file, and/or some other collection of expected or anticipated container parameters.

In some embodiments, a user may choose to make modifications to which containers are running, what operations are being performed by the containers, the compute surfaces on which the containers are running, as well as the operational parameters and/or characteristics of the containers. In such embodiments, the user may provide inputs (e.g., via a graphical user interface (GUI)) indicative of the modifications to be made. After receiving the inputs, the container orchestration system may determine what changes to make to implement the modifications, modify the container functions based on the received inputs (block 174), and update the registry, the deployment configuration file, and/or some other collection of expected or anticipated container parameters so as to maintain an accurate record of the states of each container.

At times, containers may encounter problems running or stop running entirely because of an issue with the container or an issue with the compute surface on which the container runs. For example, the compute surface may no longer be able to allocate sufficient resources to running the container, either because of a loss of resources, existing processes requiring additional resources, or new processes taking up resources. In other embodiments, the compute surface may crash, freeze, lose power, shut down, stop running, otherwise cease to operate, or operate in an impaired state. Accordingly, at block 176, the container orchestration system may periodically evaluate the OT network to identify additional or replacement compute surfaces as candidates for back up or failsafe locations to deploy replacement container in the event of a container or commute surface failure. The identified additional or replacement compute surfaces may be added to the registry as backup or failover compute surfaces.

In some embodiments, the process 160 may periodically pull data from containers and store the data in memory (e.g., as container images and/or backup files) such that if a container or compute surface fails, a replacement container may be quickly spun up and started, thus minimizing any gaps in container functionality. In some embodiments, if the container of compute surface inoperability is sensed ahead of time, anticipated, scheduled, or otherwise known, a replacement container may be spun up before the original container is spun down, such that the containers are running in parallel for a period of time and there is no gap in container functionality. Accordingly, at block 178, the process 160 receives (e.g., via the container orchestration system) an indication that a container or a compute surface is experiencing a problem or is otherwise inoperable. The indication may come in the form of an alert, an error message, an indication that power has been lost, and indication that communication has been lost, a threshold period of time passing without communication, and so forth. Accordingly, the container orchestration system may be able to detect that a device has been disconnected, has been replaced, is not functioning as expected, or has become inoperable. In other embodiments, the indication may be associated with a planned outage, a planned maintenance operation, a plan to replacement a device or compute surface, and so forth. At block 180, the process attempts to retrieve data from the container and/or the compute surface associated with the indication. If a compute surface is being replaced, data may be pulled from the existing compute surface before the compute surface is replaced and/or data may be pulled from the new compute surface after the compute surface has been replaced with the new compute surface. In some embodiments, if the container or the compute surface stops operating without warning, or before data can be retrieved, attempts to retrieve data after the indication is received may not be successful. For example, if a compute surface is removed, disconnected, or shuts down without warning, the process 160 may be unable to retrieve data from the compute surface. In such embodiments, data retrieved before the indication was received may be used to deploy a replacement container to perform the same operations as the inoperable container. Further, in some embodiments, simulated or virtual data may be used in place of data that may no longer be accessible to help ensure that the other containers may continue to perform their respective operations.

At block 182, a replacement container and/or replacement container may be identified. If the replacement container is being generated because of an issue with the container and not with the compute surface upon which the container is running, the replacement container may be deployed to the same compute surface. In such an embodiment, the container image may be updated based on data received when the container was running, and/or data stored in the container registry, and the container image may be transmitted to the compute surface to spin up the replacement container (block 184).

If the replacement container is being generated because the underlying device for the compute surface was replaced with a similar replacement device, the replacement container may be deployed to the compute surface associated with the replacement device. In such an embodiment, the container image may be updated based on data received when the container was running, and/or data stored in the container registry, and the container image may be transmitted to the compute surface to spin up the replacement container (block 184).

If a replacement container is being generated because of an issue with the compute surface (e.g., the underlying device of the compute surface crashed, the compute surface no longer has sufficient available resources to run the container, etc.) a replacement compute surface may be identified from the container registry, as described above with regard to block 176. In such an embodiment, the container image may be updated based on data received when the container was running, and/or data stored in the container registry, and the container image may be transmitted to the replacement compute surface to spin up the replacement container (block 184).

In the event that a device associated with a compute surface unexpectedly experiences a problem and can no longer run a container, a replacement container may be deployed to a failover compute surface (e.g., a failover candidate compute surface identified in the container registry). In the meantime, while a replacement container runs on the different compute surface, the issue with the device associated with the original compute surface may be addressed (e.g., device replaced, problem diagnosed and fixed, etc.). Accordingly, once the compute surface resumes operating as expected, the container orchestration system may spin down the replacement container and redeploy the container on the original compute surface. However, in other embodiments, the container orchestration system may choose to continue to operate the replacement container on the failover compute surface.

As described in more detail above, the process 160 utilizing one or more industry profiles and/or one or more operation modes to determine a baseline architecture of containers to deploy on various compute surfaces in the operation of an industrial automation system. After deployment, containers may be monitored and a container registry updated based on modifications to the containers. In some embodiments, the container registry may identify additional and/or replacement compute surfaces to be used if a container or compute surface becomes inoperable and a replacement container is deployed. In such cases, the process may attempt to gather a last data set, and then deploy a replacement container on the same or a replacement compute surface.

In some cases, OT devices may receive remote updates for receiving firmware updates, software updates, security updates, operating parameters updates, and so forth. In some embodiments, the OT devices may receive the updates directly from the cloud, whereas in other embodiments, the update may be received via an intermediate network device, such as a gateway device or an edge device. In some embodiments, the updates may be pushed directly to the OT devices when ready. In other embodiments, the OT device may request or pull the update from the cloud, in response to an indication that an update is available, or a periodic check to see if an update is available. In further embodiments, updates may be pushed to an intermediate location, such as an edge device or gateway device, and then pulled by the OT device when the OT device is ready for the update. Further, in some embodiments, one or more containers may be deployed to the device or near the device to facilitate the update. However, some customers may be hesitant to allow the OT device to install updates on an ad hoc basis when updates are available. A customer may have many reasons for this. First, the customers may want to prevent the OT device from installing the update in the middle of performing a process, or in the middle of a set or processes (e.g., in the middle of a shift). Instead, the customer may wish to wait until a more convenient time (e.g., between shifts, overnight, over the weekend, etc.) to install the update. Second, the customer may be concerned that if a first device is updated, but a second device that performs a coordinated process with the first device has not been updated, that the coordinated process may not be performed correctly until both devices have been updated. Third, the customer may wish to wait until the updates have been installed without incident by other customers before installing the update themselves.

Accordingly, FIG. 8 is a flowchart of a process 200 for updating an OT device. At block 202, a request is received to send an update to an OT device. The request may come from the distributor of the update (e.g., an original equipment manufacturer, service provider, etc.), from the OT device, or from some other intermediate device, such as an edge device and/or a gateway device. At block 204, the process determines whether the OT device is in a safe state. For example, before scheduling an update to be pushed to a container deployed at or near the OT device, a container deployment system may monitor the computing state of the respective device and the machine state of the respective device and the related devices. The machine state may provide context with regard to the safety and/or ongoing processes of the machines within the industrial automation system. For example, if a container detects or has access to data indicating that a light curtain has been active within a certain amount of time, the container deployment system may determine that an individual may be present in the facility and an update should not be pushed to the device at that time and that the update should be pushed to the device and installed when a person is not present. That is, the device is not in a safe state if a person has been detected within a threshold distance of the device within in threshold amount of time. Alternatively, in another example, the container deployment system may confirm that a user overseeing or maintaining the system is authenticated to perform the update, and thus push the update to the device for implementation. In this way, the container deployment system considers the computational resources, as well as the machine/environment states of the system, to ensure that the update is being provided at an appropriate time.

At block 206, the process 200 determines whether the device has sufficient resources for the update. For example, the process may identify an amount of memory to be occupied by the update and determine whether the device has sufficient memory to store the update file or update package. Additionally, the process 200 may identify an amount of processing/computing resources needed to install and run the update and determine whether the device has the amount of processing/computing resources to install and run the update. For example, in some embodiments, the device may run one or more containers to install or otherwise facilitate the update. Further, in some cases, the update may increase available features over the previous version, resulting in the updated version consuming more resources to run. Alternatively, the update may streamline existing processes and improve efficiency, resulting in the updated version consuming fewer resources to run. Accordingly, the updated version may consume substantially more or fewer computing resources once installed and running. Accordingly, the process 200 may determine whether the device has sufficient resources to run the updated version.

At block 208 the process 200 transmits a request to a gateway device to receive the update. The gateway device may facilitate communication between the IT network and the cloud-based computing device. In some embodiments, the container deployment system may reside within the industrial or OT network, while the gateway device or nested edge device operates in an IT network. The container deployment system may serve as a bridge to the OT devices, while only implementing or deploying functions when the machine state and computational resources are amenable to the update. As a result, the edge device may receive a request for an update after the container deployment system determines or schedules an appropriate to time to receive the update. Accordingly, the gateway device requests the update from the cloud-based computing device and the cloud-based computing device transmits the update to the gateway device. In other embodiments, the cloud-based computing device may transmit (e.g., push) the update to the gateway device when the update is ready for distribution. The gateway device may store the update for a period of time if the OT device is not in a safe state or otherwise ready to receive the update. The gateway device pushes the update to the OT device or the OT device may pull the update from the gateway device.

At block 210, the process 200 identifies containers to deploy to the OT device to install or otherwise perform the update. The containers to deploy the update may be defined in the update itself, or in an update package. In other embodiments, the containers to deploy may be identified based on characteristics of the update. At block 212, the process deploys containers to execute the update while maintaining the device in a safe state. For example, the container orchestration system may transmit one or more container images to the target OT device, and/or one or more other devices around the target OT device to execute the update. The devices that receive container images may then spin up the containers associated with the container images, which coordinate to perform the update. At block 214, after the update is complete, the containers are spun down and resources occupied by the containers are freed up for other tasks (e.g., instructions are sent to the device to stop running the containers).

As described in more detail above, process 200 is generally directed to receiving a request to update a device and determining that the device is in a safe state (e.g., no people nearby, no ongoing processes, device has been shut down for the day, an authorized technician is present, etc.). If the device is in a safe state, the process determines whether the device has sufficient resources to execute the update, deploys containers to execute the update while maintaining a safe state, and spins down or shuts down the containers when the update is complete.

In motion system, especially motion systems that utilize rotary motors, there may be one or more factors affecting the operation of the motor that is not considered by a simulation model, or one or more factors that are affecting the operation of the motor in a different way than in the model. For example, component wear, the way two components interact with one another, unusual or unexpected atmospheric conditions (e.g., particularly high or low temperatures, high humidity, high pressure, etc.) the presence of one or more chemicals or vapors that may affect the operation of the motor (e.g., by causing a seal to deteriorate, reacting with a lubricant, etc.), and so forth may cause the actual operation of a motor to vary from a simulation model. This may be especially true in non-direct drive applications in which torque transfer of loads occurs, such as systems that include a gear box. Accordingly, a simulation model may not accurately predict motor torque in a particular application. This may cause customers to be hesitant to adopt technology that uses simulation models, such as digital twins, which are digital simulations of real-world systems. Accordingly, model accuracy may be a barrier to wider adoption of digital twin technology. Using additional sensors can be an effective way to improve simulation model accuracy, but acquiring, installing, and using the additional sensors may be cost prohibitive for some customers. Further, run time model learning running on multiple similar devices simultaneously within an OT network may utilize more computational resources than are available on the network. Accordingly, FIG. 9 is a flow chart of a process 240 for using additional sensors to update a model of a device or system and distributing the updated model to similar devices and/or systems.

At block 242 a request for model analysis is received. The request may be generated upon request by a user and/or technician (e.g., based on inputs received via a GUI), by a controller, or automatically. The request may be in response to the desire of the user or technician to analyze a model, some period of time or number of cycles passing, the real-world device deviating from the model by a threshold amount, anomalous data being collected/generated, an update being available, etc.

At block 244, the process 240 identifies one or more nearby compute surfaces with sufficient resources to perform the analysis. For example, analyzing the simulation model may involve deploying one or more containers to the device or to compute surfaces of one or more other devices near the device. Accordingly, in some embodiments, block 244 may include identifying one or more containers to deploy. Deployed containers may coordinate, for example, acquiring collected data, pre-processing collected data (e.g., filtering data, removing duplicate or anomalous/outlier data points, correcting data, etc.), processing collected data (e.g., identifying trends, fitting the data to a model), transmitting data to the cloud, training or retraining a model based on collected data, receiving an updated model (e.g., for training or retraining a model in the cloud), diagnosing conditions, transmitting the updated model to other devices, and so forth. Accordingly, the sufficient resources may refer to sufficient memory to store the data to be collected and/or generated during the model analysis, the stored the files associated with the containers to be deployed, and so forth while still performing their functions within the OT network. Further, the sufficient resources may include computing or processing resources to run script, code, and/or software associated with the model analysis, run the one or more containers, train a machine learning model, execute algorithms, and so forth. At block 246, the process 240 deploys one or more containers to the identified compute surfaces. In some embodiments the containers may be deployed automatically, whereas in other embodiments, a proposed container deployment may be presented to a user for approval (e.g., via a GUI). As previously discussed, the container deployment may include generating and/or retrieving container images for the identified containers and transmitting the container images to the identified one or more compute surfaces for execution.

At block 248, one or more of the deployed containers may collect data from the device and/or one or more sensors that collects data pertaining to the process or operation being performed by the device. The data may include, for example, temperature, linear speed, rotational speed, torque, force, pressure, voltage, current, power, input signal, output signal, displacement, pressure, and so forth. As previously described, in some embodiments, the collected data may be processed or preprocessed. Further, if multiple containers are deployed, the containers may be configured to perform different functions and the containers may transmit data to one another such that each container can perform its function. For example, containers may be used to acquire collected data, pre-process collected data (e.g., filter data, remove duplicate or anomalous/outlier data points, correct data, etc.), process collected data (e.g., identify trends, fit the data to a model), transmit data to the cloud, train or retrain a model based on collected data, receive an updated model, transmit the updated model to other devices, etc. At block 250, the process 240 updates the model or generates a new model based on the collected data. This may include, for example, adjusting one or more operating parameters, recognizing a correlation between a parameter of the model and a condition or variable sensed by one of the additional sensors, considering more factors, considering fewer factors, expanding the training data set, adjusting the training data set, and so forth. Once the model has been updated or generated, at block 252, the updated model is distributed to other devices that perform similar functions in the same facility or other facilities. For example, the updated model may be provided to a system that performs the same or similar function on another line performing the same or similar process, or generating the same or similar product. In other embodiments, the updated model may be provided to a system that performs the same or similar function on a line that performs an entirely different process and/or produces and entirely different product. For example, an updated model for bottling generated based on soda bottling may be shared with an entity that bottles sunscreen. In some embodiments, the distribution may be via containers within the OT network. As such, the process 240 is utilized to build and refine the model on one device in a real customer application, with additional sensors as needed, and share the updated model to other similar devices in the same customer plant via container technology. In some embodiments, the updated model may be uploaded to a remote server or cloud-based computing device operated by a service provider, original equipment manufacturer, supplier, vendor, etc. and shared with other customers that operate similar systems. In such embodiments, steps may be taken to anonymize the data and scrub the data of any trade secrets, sensitive information, identifying information, and so forth. The motor models which can benefit from this technology are not limited to torque estimation. Other models include thermal model, bearing life prediction, among others. In some embodiments, the simulation model may be generated and updated on a rolling basis. Accordingly, the model can be continuously improved using collected data and distributed to similar devices operating in the same or other customer plants through cloud. At block 254, the containers are spun down (e.g., instructions to stop running containers are sent), the container registry updated, and resources release to be utilized by some other purpose.

The presently disclosed techniques include utilizing one or more industry profiles and/or one or more operation modes to determine a baseline architecture of containers to deploy on various compute surfaces in the operation of an industrial automation system. After deployment, containers may be monitored and a container registry updated based on modifications to the containers. In some embodiments, the container registry may identify additional and/or replacement compute surfaces to be used if a container or compute surface becomes inoperable and a replacement container is deployed. In such cases, the process may attempt to gather a last data set, and then deploy a replacement container on the same or a replacement compute surface. Technical effects of utilizing the disclosed techniques may include reduced time setting up a container architecture for an application less reliance on trial and error arriving at an efficiently running container architecture. The disclosed techniques also reduce downtime and lost data in the event of a device or container failing by quickly and efficiently deploying a replacement container.

Additionally, the disclosed techniques include receiving a request to update a device and determining that the device is in a safe state (e.g., no people nearby, no ongoing processes, device has been shut down for the day, an authorized technician is present, etc.). If the device is in a safe state, the process determines whether the device has sufficient resources to execute the update, deploys containers to execute the update while maintaining a safe state, and spins down or shuts down the containers when the update is complete. Technical effects of utilizing the disclosed techniques include that updates are performed in a safe and stable environment, reducing the possible risk of something happening if an update is attempted at an inconvenient time, while also preventing customers from waiting too long to execute what may be an important update.

Further, the disclosed techniques include building and refine a simulates model on one device in a real customer application, with additional sensors as needed, and sharing the updated model to other similar devices in the same or different customer plants via container technology. In some embodiments, the updated model may be uploaded to a remote server or cloud-based computing device operated by a service provider, original equipment manufacturer, supplier, vendor, etc. and shared with other customers that operate similar systems. Accordingly, technical effects of the present disclosure include fine tuning and/or updating a model using one or more sets of sensors once, and then using the updated model in multiple instantiations, resulting in a more efficient use of both computing and hardware resources.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer readable medium storing instructions that, when executed by a processor, cause the processor to perform operations, comprising:
   receiving an indication of a request for analysis of a simulation model associated with an industrial automation system, wherein the simulation model simulates one or more characteristics of the industrial automation system, wherein the industrial automation system comprises a plurality of devices configured to perform one or more operations within the industrial automation system, wherein each of the plurality of devices comprises a respective compute surface configured to perform one or more software tasks;
   identifying a first device of the plurality of devices having sufficient resources to perform the analysis; and
   deploying a container to the first device, wherein the first device is configured to execute the container on the respective compute surface, wherein the container is configured to:
      collect data from one or more sensors disposed in or around the industrial automation system;
      update the simulation model based on the collected data; and
      provide the updated simulation model for distribution to one or more other devices of the plurality of devices.

2. The non-transitory computer readable medium of claim 1, wherein the instructions, when executed by the processor, cause the processor to:
   identify a plurality of containers, including the container and an additional container, to deploy to one or more additional devices, including the first device, of the plurality of devices, to perform the analysis of the simulation model, wherein the container is configured to perform a first aspect of the analysis of the simulation model, and wherein the additional container is configured to perform a second aspect of the analysis of the simulation model; and
   deploy the additional container to the first device or an additional device.

3. The non-transitory computer readable medium of claim 2, wherein the plurality of containers comprises a data acquisition container, a data processing container, a model training container, or any combination thereof.

4. The non-transitory computer readable medium of claim 2, wherein the instructions, when executed by the processor, cause the processor to:
   present, via a graphical user interface (GUI) an indication of the plurality of containers for approval; and receive, via the GUI, before deployment of the container and the additional container, an input indicative of an approval of the plurality of containers.

5. The non-transitory computer readable medium of claim 1, wherein the instructions, when executed by the processor, cause the processor to update the simulation model based on the collected data by identifying a correlation in the collected data and updating the simulation model based on the correlation.

6. The non-transitory computer readable medium of claim 1, wherein the instructions, when executed by the processor, cause the processor to deploy the container to the first device comprises transmitting a container image corresponding to the container to the first device, wherein the first device is configured to execute the container image on the respective compute surface.

7. The non-transitory computer readable medium of claim 1, wherein the collected data comprises a temperature, a linear speed, a rotational speed, a torque, a force, a pressure, a voltage, a current, a power, an input signal, an output signal, a displacement, or any combination thereof.

8. A method, comprising:
receiving, via at least one processor, an indication of a request for analysis of a simulation model associated with an industrial automation system comprising a plurality of devices, wherein the simulation model simulates one or more characteristics of the industrial automation system;
identifying, via the at least one processor, a first device of the plurality of devices having sufficient resources to perform at least a portion of the analysis;
deploying, via the at least one processor, a container to the first device, wherein the first device is configured to execute the container on a respective compute surface, wherein the container is configured to collect data from one or more sensors disposed in or around the industrial automation system;
receiving, via the at least one processor, the collected data from the container;
updating, via the at least one processor, the simulation model based on the received collected data; and
transmitting, via the processor, the updated simulation model to one or more other devices that perform one or more operations within the industrial automation system.

9. The method of claim 8, wherein the one or more operations performed by the one or more other devices within the industrial automation system have the same one or more characteristics simulated by the simulation model.

10. The method of claim 8, comprising:
receiving an additional set of collected data from the container;
further updating the simulation model based on the received additional set of collected data; and
transmitting the further updated simulation model to the one or more other devices that perform the one or more operations within the industrial automation system.

11. The method of claim 8, comprising sending instructions to the first device to cease executing the container in response to updating the simulation model based on the received collected data.

12. The method of claim 8, comprising transmitting, via a gateway device, the updated simulation model to a cloud-based computing device for distribution to one or more other industrial automation systems.

13. The method of claim 8, comprising:
identifying, via the at least one processor, an additional device of the plurality of devices having sufficient resources to perform at least a second portion of the analysis; and
deploying, via the at least one processor, an additional container to the additional device, wherein the additional device is configured to execute the additional container on the respective compute surface, wherein the additional container is configured to:
receive the collected data;
apply one or more algorithms to the collected data to generate processed data; and
transmit the processed data to the processor; and
receive the processed data from the additional container, wherein updating the simulation model is based on the received collected data and the processed data.

14. A system, comprising:
a plurality of industrial automation devices configured to perform one or more operations within an industrial automation system, wherein each of the plurality of industrial automation devices comprises a respective compute surface configured to perform one or more software tasks; and
a gateway device configured to operate on an information technology (IT) network and an operational technology (OT) network;
a processor configured to:
receive an indication of a request for analysis of a simulation model associated with the industrial automation system, wherein the simulation model simulates one or more characteristics of the industrial automation system;
identify a first industrial automation device of the plurality of industrial automation devices having sufficient resources to perform the analysis;
deploy a container to the first industrial automation device, wherein the first industrial automation device is configured to execute the container on the respective compute surface, wherein the container is configured to collect data from one or more sensors disposed in or around the industrial automation system;
receive the collected data from the container;
transmit the collected data to the gateway device;
receive an updated simulation model from the gateway device; and
provide the updated simulation model for distribution to one or more other industrial automation devices of the plurality of industrial automation devices.

15. The system of claim 14, wherein the request for the analysis is generated in response to an input received via a graphical user interface (GUI).

16. The system of claim 14, wherein the request for the analysis is generated in response to a period of time elapsing, a number of cycles being performed, or a combination thereof.

17. The system of claim 14, wherein the request for the analysis is generated in response to data generated by the simulation model deviating from the collected data by a threshold amount.

18. The system of claim 14, wherein the gateway device is configured to:
transmit the collected data to an additional industrial automation device of the plurality of industrial automation devices to generate the updated simulation model;

receive the updated simulation model from the additional industrial automation device; and transmit the updated simulation model to the processor.

19. The system of claim 14, wherein the gateway device is configured to:

transmit the collected data to a cloud-based computing device to generate the updated simulation model;

receive the updated simulation model from the cloud-based computing device; and transmit the updated simulation model to the processor.

20. The system of claim 14, wherein the processor is configured to identify the one or more other industrial automation devices of the plurality of industrial automation devices by determining that the one or more other industrial automation devices perform functions in the industrial automation system having the same one or more characteristics simulated by the simulation model.

* * * * *